2 Sheets—Sheet 1

D. D. POWLES.
Bee Hive.

No. 235,570. Patented Dec. 14, 1880.

Witnesses.
George Binkenburg
Albert H. Krause

Inventor:
Daniel D. Powles
By Daniel Breed Atty

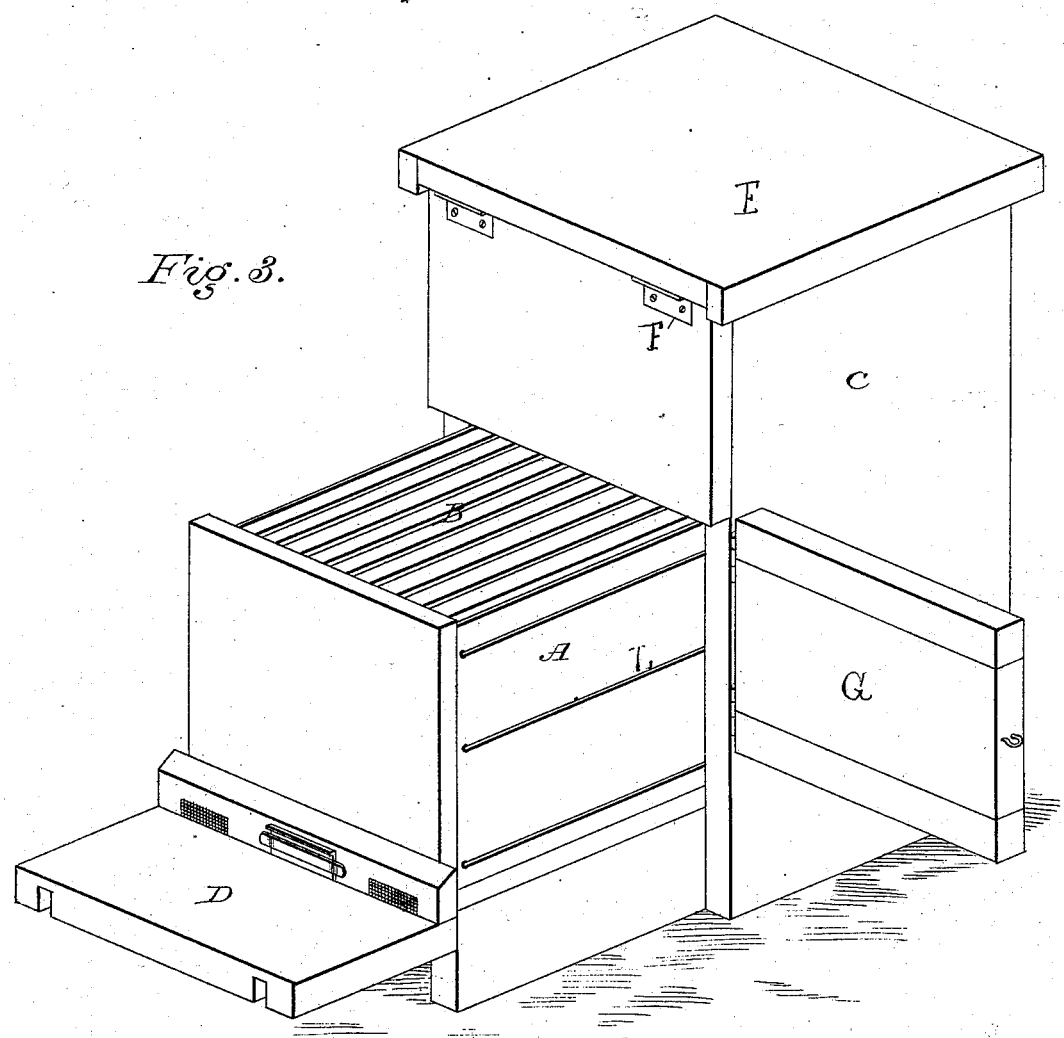

UNITED STATES PATENT OFFICE.

DANIEL D. POWLES, OF BLUE MOUND, ILLINOIS, ASSIGNOR OF ONE-HALF TO JOHN C. POWLES, OF SAME PLACE.

BEE-HIVE.

SPECIFICATION forming part of Letters Patent No. 235,570, dated December 14, 1880.

Application filed August 28, 1879.

*To all whom it may concern:*

Be it known that I, DANIEL D. POWLES, of Blue Mound, in the county of Macon and State of Illinois, have invented certain Improvements in Bee-Hives, of which the following is a specification.

My invention relates to that class of bee-hives in which the brood-chamber may be withdrawn; and it consists of plates of tin attached to the outer comb-frames and arranged to slide close to the outer wall of the hive, in order to prevent the bees from attaching the comb to said outer wall, and thus interfering with the withdrawal of the brood-chamber or comb-frames.

Figure 1:
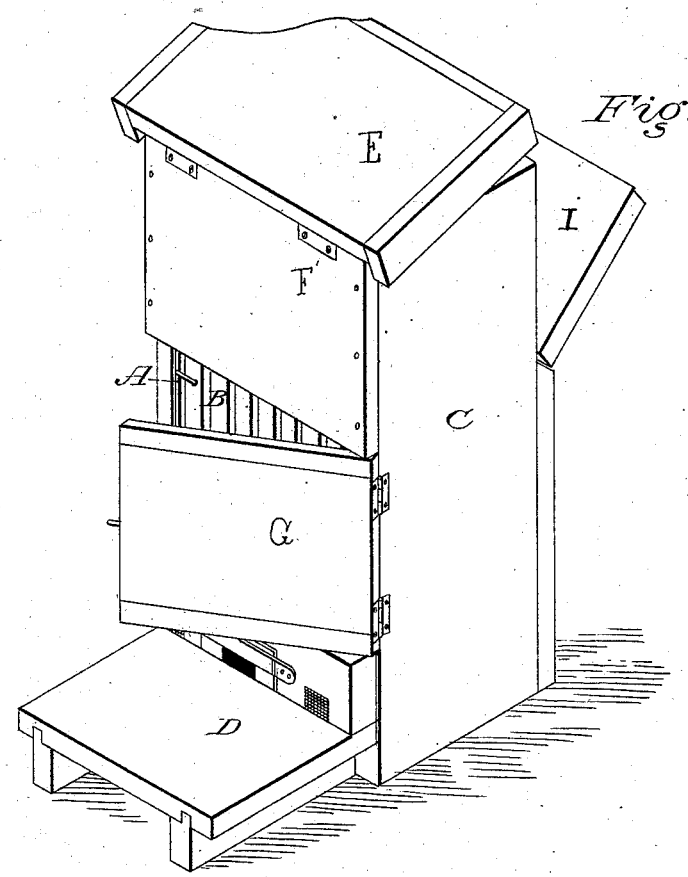
Figure 2:
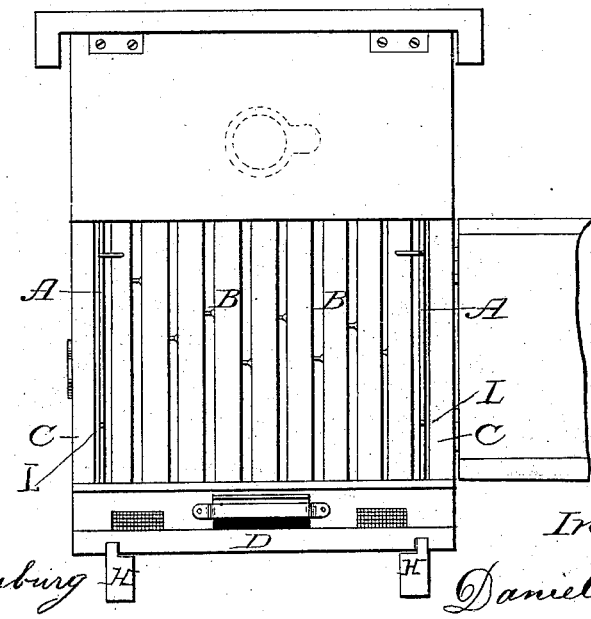

In the accompanying drawings, Figure 1 is a perspective view of my bee-hive, the doors G and I being ajar. Fig. 2 is a front view of the same. Fig. 3 represents my hive with the brood-chamber withdrawn.

My invention consists in tin or metallic plates attached to the two outer comb-frames, in combination with the sliding foundation, in order to separate these frames from the wall of the hive, and thus exclude the working-bees, so as to prevent them from attaching the comb to the wall, which would prevent the frames from being withdrawn.

The general construction of my bee-hive may be as shown in the drawings, or somewhat varied, if desired.

The cover E of the hive may have hinges F, and inside there may be provided removable honey-boxes, in the usual manner.

The brood-chamber and platform D are arranged to slide forward and backward on the tracks H at pleasure. Thus the brood-chamber can be withdrawn and inspected, or the frames B (one or more of the same) may be taken away when it is desired to reduce a large swarm and strengthen a weak one, as is often practiced; but in thus withdrawing the brood-chamber there is often a difficulty, because the working-bees sometimes build against the wall of the hive. Now, to remedy this difficulty I have attached to the outer comb-frame a tin plate, A, held in place by wires L, so as to become a part of the frame or move therewith, thus separating the outer frame from the wall C of the hive, and allowing the brood-chamber to be withdrawn with the whole series of removable comb-frames B.

I have tried this device of a tin plate to separate the outer frame from the wall of the hive, and I find it successful.

Having described my invention, what I claim is—

A bee-hive body, C, having a sliding foundation, D, carrying comb-frames B, in combination with the tin plates A, attached to the outside of the outer frames, as and for the purpose set forth.

DANIEL DITCH POWLES.

Witnesses:
JOHN TRAINER,
W. S. MCCONNELL,
CHAS. A. SHIRLEY.